(12) United States Patent
Samuel et al.

(10) Patent No.: US 11,050,781 B2
(45) Date of Patent: Jun. 29, 2021

(54) SECURE APPLICATION MONITORING

(71) Applicant: Microsoft Technology Licensing, LLC, Redmond, WA (US)

(72) Inventors: Arjmand M. Samuel, Redmond, WA (US); Chipalo N. Street, Seattle, WA (US); Damon Luke Barry, Redmond, WA (US); Eustace Asanghanwa, Kirkland, WA (US); James W. Osborne, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 144 days.

(21) Appl. No.: 15/903,938

(22) Filed: Feb. 23, 2018

(65) Prior Publication Data

US 2019/0109874 A1    Apr. 11, 2019

Related U.S. Application Data

(60) Provisional application No. 62/571,029, filed on Oct. 11, 2017.

(51) Int. Cl.
*H04L 29/06* (2006.01)
*H04L 9/08* (2006.01)
(Continued)

(52) U.S. Cl.
CPC .......... *H04L 63/1441* (2013.01); *G06F 21/14* (2013.01); *G06F 21/44* (2013.01);
(Continued)

(58) Field of Classification Search
CPC ... H04L 63/20; H04L 63/1441; H04L 63/101; H04L 63/123; H04L 2209/12;
(Continued)

(56) References Cited

U.S. PATENT DOCUMENTS 8,060,934 B2   11/2011   Cabuk et al.
8,688,991 B1    4/2014   Sunil et al.
(Continued)

FOREIGN PATENT DOCUMENTS

WO    2016048177 A1    3/2016

OTHER PUBLICATIONS

Wen Hu et al, "Toward Trusted Wireless Sensor Networks", in Proceedings of ACM Transactions on Sensor Networks vol. 7 No. 1, Aug. 20, 2010, 25 Pages.
(Continued)

*Primary Examiner* — Ashokkumar B Patel
*Assistant Examiner* — William B Jones
(74) *Attorney, Agent, or Firm* — Mannava & Kang, P.C.

(57) ABSTRACT

Example of secure monitoring of modular applications and associated edge devices are described herein. In an example, an accreditation request is initiated to accredit at least one of a modular application and an edge device hosting the modular application. The edge device may a device coupling an IoT device to a cloud server. Based on initiating, accreditation information corresponding to at least one of the modular application and the edge device may be received. The accreditation information are generated by a hardware encryption device associated with the edge device. Further, an accreditation status of the modular application may be monitored during execution of the modular application to ascertain whether the modular application and the edge device have been tampered. In case tampering is detected, a remedial action to address the tampering may be performed.

18 Claims, 10 Drawing Sheets

(51) Int. Cl.
| | |
|---|---|
| *H04L 9/32* | (2006.01) |
| *H04L 12/14* | (2006.01) |
| *H04W 4/70* | (2018.01) |
| *G06F 21/57* | (2013.01) |
| *H04M 15/00* | (2006.01) |
| *G06F 21/14* | (2013.01) |
| *G06F 21/62* | (2013.01) |
| *H04W 12/10* | (2021.01) |
| *G06F 21/64* | (2013.01) |
| *G06F 21/44* | (2013.01) |
| *H04W 12/128* | (2021.01) |
| *G06F 21/53* | (2013.01) |
| *H04L 29/08* | (2006.01) |
| *H04W 4/80* | (2018.01) |

(52) U.S. Cl.
CPC ............. *G06F 21/53* (2013.01); *G06F 21/57* (2013.01); *G06F 21/6218* (2013.01); *G06F 21/64* (2013.01); *H04L 9/0877* (2013.01); *H04L 9/0897* (2013.01); *H04L 9/3234* (2013.01); *H04L 9/3239* (2013.01); *H04L 9/3247* (2013.01); *H04L 12/14* (2013.01); *H04L 12/141* (2013.01); *H04L 63/0823* (2013.01); *H04L 63/101* (2013.01); *H04L 63/123* (2013.01); *H04L 63/20* (2013.01); *H04M 15/47* (2013.01); *H04W 4/70* (2018.02); *H04W 12/10* (2013.01); *H04W 12/128* (2021.01); *G06F 2221/2149* (2013.01); *H04L 67/10* (2013.01); *H04L 67/12* (2013.01); *H04L 2209/12* (2013.01); *H04L 2209/127* (2013.01); *H04L 2209/38* (2013.01); *H04W 4/80* (2018.02)

(58) Field of Classification Search
CPC ............. H04L 2209/127; H04L 9/0897; H04L 9/3247; H04L 9/3234; H04L 2209/38; G06F 21/44; G06F 21/14; G06F 21/53; G06F 21/57; G06F 21/64; G06F 21/6218; G06F 2221/2149; H04W 4/70; H04W 4/80; H04W 4/1208; H04W 12/10; H04M 15/47

See application file for complete search history.

(56) References Cited

U.S. PATENT DOCUMENTS

| | | | |
|---|---|---|---|
| 9,577,999 | B1 | 2/2017 | Lindemann et al. |
| 9,804,867 | B2 | 10/2017 | Lee et al. |
| 9,894,099 | B1 | 2/2018 | Jacobsen et al. |
| 10,514,978 | B1 | 12/2019 | Lee et al. |
| 10,680,816 | B2 | 6/2020 | Antoni et al. |
| 2003/0172278 | A1 | 9/2003 | Farnham et al. |
| 2004/0030932 | A1 | 2/2004 | Juels et al. |
| 2006/0177051 | A1 | 8/2006 | Lauter et al. |
| 2007/0101138 | A1 | 5/2007 | Camenisch |
| 2008/0077994 | A1 | 3/2008 | Comlekoglu |
| 2008/0205655 | A1 | 8/2008 | Wilkins et al. |
| 2009/0222668 | A1 | 9/2009 | Zaccone et al. |
| 2010/0161998 | A1 | 6/2010 | Chen et al. |
| 2011/0116635 | A1* | 5/2011 | Bar-El ................... H04L 9/088 380/278 |
| 2012/0163589 | A1 | 6/2012 | Johnson et al. |
| 2012/0240236 | A1 | 9/2012 | Wyatt et al. |
| 2013/0061056 | A1 | 3/2013 | Proudler et al. |
| 2013/0166712 | A1 | 6/2013 | Chandramouli et al. |
| 2013/0238752 | A1 | 9/2013 | Park et al. |
| 2013/0347064 | A1 | 12/2013 | Aissi |
| 2016/0373474 | A1* | 12/2016 | Sood ....................... G06F 21/53 |
| 2017/0046664 | A1 | 2/2017 | Haldenby et al. |
| 2017/0180314 | A1 | 6/2017 | Walker et al. |
| 2017/0201423 | A1 | 7/2017 | Crowe et al. |
| 2017/0221029 | A1 | 8/2017 | Lund et al. |
| 2017/0279774 | A1 | 9/2017 | Booz et al. |
| 2018/0117446 | A1 | 5/2018 | Tran et al. |
| 2018/0191714 | A1 | 7/2018 | Jentzsch et al. |
| 2018/0196945 | A1 | 7/2018 | Kornegay et al. |
| 2018/0255130 | A1* | 9/2018 | Kozloski ............... H04L 9/3239 |
| 2018/0287780 | A1* | 10/2018 | Safford .................. G06F 21/51 |
| 2018/0365686 | A1 | 12/2018 | Kondo |
| 2019/0034465 | A1 | 1/2019 | Shimamura |
| 2019/0065093 | A1 | 2/2019 | Karr et al. |
| 2019/0065681 | A1 | 2/2019 | Gmeiner |
| 2019/0065733 | A1 | 2/2019 | Forehand |
| 2019/0103958 | A1* | 4/2019 | Wu ....................... G06F 16/903 |
| 2019/0109877 | A1 | 4/2019 | Samuel et al. |
| 2019/0132329 | A1 | 5/2019 | Verberkt et al. |
| 2019/0318103 | A1* | 10/2019 | Anton ................. G06F 12/1018 |
| 2020/0021446 | A1 | 1/2020 | Roennow et al. |

OTHER PUBLICATIONS

"International Search Report and Written Opinion Issued in PCT Application No. PCT/US18/046391", dated Nov. 16, 2018, 11 Pages.

Laszka, et al., "Providing Privacy, Safety, and Security in IoT-Based Transactive Energy Systems using Distributed Ledgers", Retrieved From: arxiv.org, Sep. 27, 2017, 8 Pages.

"International Search Report & Written Opinion for PCT Patent Application No. PCT/US18/046393", dated Nov. 20, 2018, 11 pages.

Zhang, et al., "REM: Resource-Efficient Mining for Blockchains", Published in International Association for Cryptographic Research, Mar. 6, 2017, 27 Pages.

"Non Final Office Action Issued in U.S. Appl. No. 15/903,970", dated Apr. 22, 2020, 11 Pages.

"Final Office Action Issued in U.S. Appl. No. 15/903,970", dated Sep. 25, 2020, 19 Pages.

"Non Final Office Action Issued in U.S. Appl. No. 15/903,970", dated Jan. 29, 2021, 20 Pages.

* cited by examiner

800

INITIATE ACCREDITATION OF AT LEAST ONE OF A MODULAR APPLICATION AND AN EDGE DEVICE HOSTING THE MODULAR APPLICATION
802

RECEIVE ACCREDITATION INFORMATION FOR THE MODULAR APPLICATION
804

MONITOR ACCREDITATION STATUS OF THE MODULAR APPLICATION
806

TAMPERING DETECTED?
808

No →

Yes ↓

PERFORM A REMEDIAL ACTION TO ADDRESS THE TAMPERING
810

METER RESOURCE UTILIZATION BY THE MODULAR APPLICATION
812

```
┌─────────────────────────────────────────────────┐
│  RECEIVE A REQUEST TO SECURE A MODULAR APPLICATION │
│         ASSOCIATED WITH AN EDGE DEVICE            │
│                      902                          │
└─────────────────────────────────────────────────┘
                        │
                        ▼
┌─────────────────────────────────────────────────┐
│  GENERATE A SECURE ENCLAVE FOR THE MODULAR APPLICATION │
│                      904                          │
└─────────────────────────────────────────────────┘
                        │
                        ▼
┌─────────────────────────────────────────────────┐
│   MONITOR THE MODULAR APPLICATION FOR METERING AND │
│  TAMPERING, THE METERING BEING PERFORMED USING A  │
│              DISTRIBUTED LEDGER                   │
│                      906                          │
└─────────────────────────────────────────────────┘
                        │
                        ▼
┌─────────────────────────────────────────────────┐
│ GENERATE A RESOURCE UTILIZATION RECEIPT INDICATIVE OF │
│  FINANCIAL UNITS CORRESPONDING TO UNITS OF RESOURCE │
│         CONSUMED BY THE MODULAR APPLICATION       │
│                      908                          │
└─────────────────────────────────────────────────┘
```

*FIG. 9*

1000
RECEIVE A REQUEST TO GENERATE ONE OR MORE SECURE ENCLAVES FOR ONE OR MORE MODULAR APPLICATIONS
1002
INITIALIZING THE MODULAR APPLICATION IN THE SECURE ENCLAVES
1004
INTERCONNECT OUTPUTS OF THE MODULAR APPLICATIONS TO GENERATE A SYSTEM OR SERVICE
1006
MONITOR UTILIZATION OF THE MODULAR-APPLICATIONS IN THE SECURE ENCLAVES TO DETERMINE THE METERING FOR THE SERVICE
1008
FIG. 10

SECURE APPLICATION MONITORING

CLAIM FOR PRIORITY

The present application claims the benefit of priority to U.S. Provisional Application Ser. No. 62/571,029 having the title "SECURE APPLICATION MONITORING AND METERING," filed on Oct. 11, 2017, the disclosure of which is hereby incorporated by reference in its entirety.

BACKGROUND

Cloud computing refers to applications or services hosted on servers in communication with remote devices. Cloud computing achieves economies of scale by centralizing the computational power in server farms. Centralizing the computing power reduces overheads associated with computing and administration. Also, cloud computing amortizes the hardware costs over applications and users.

However, cloud computing may not be a suitable option in some cases. For example, communication to a cloud server may not be available all the time and communication may be impractical for certain applications. For example, a self-driving car may require local decisions. In such cases, communication may not be fast enough or there may be network connectivity related issues. While decisions may benefit from faster execution on a local device, the improvements in machine learning at a local device may globally benefit other local devices.

Such local devices may be in form of Internet of Things (IoT) devices, which may host modular applications to perform required tasks. Modular applications may refer to discrete applications, which perform device-specific functions, such as, for example, reading data from a particular hardware sensor. In another example, the modular applications may refer to discrete parts of a larger, distributed application, where such parts may run on the IoT devices to enable local decisions, protect sensitive information, or otherwise optimize some aspect of the application. The IoT devices may include everyday objects such as, for example, toasters, coffee machines, thermostat systems, washers, dryers, lamps, automobiles, and the like. The IoT devices can also include sensors in buildings and factory machines, sensors and actuators in remote industrial systems, and the like. The IoT devices may be used for automation, data capture, providing alerts, personalization of settings, and numerous other applications.

A number of technical problems arise in running modular applications on devices that form an IoT network. For example, the modular applications on the local devices may provide a hostile environment as the applications may be authored by a source whose authenticity may be questionable. As a result, executing modular applications securely on such devices may be challenging. Furthermore, monitoring and metering of resources and the modular applications on such devices may be difficult.

BRIEF DESCRIPTION OF THE DRAWINGS

Features of the present disclosure are illustrated by way of example and not limited to the following Fig.(s), in which like numerals indicate like elements:

FIG. 8 illustrates a flowchart of a method for securing, monitoring and metering modular applications, according to an example implementation of the present disclosure; and FIG. 9 illustrates a flowchart of a method for metering modular applications, in accordance with an example implementation of the present disclosure.

FIG. 10 illustrates a flowchart for generating a service or an application using a combination of modular application, according to an embodiment of the present disclosure.

DETAILED DESCRIPTION

Figure 1:
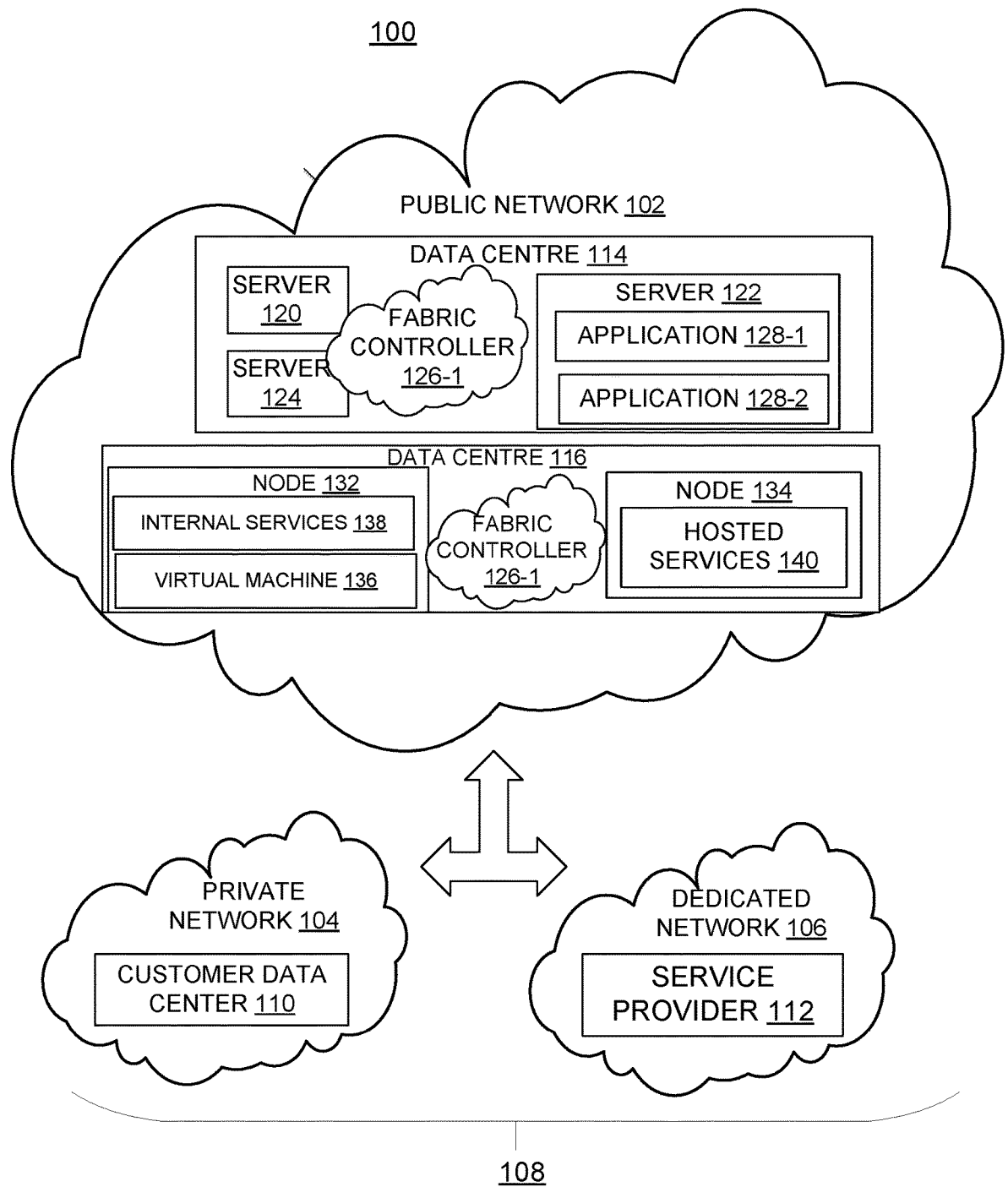
FIG. 1 illustrates an example block diagram illustrating a cloud-computing architecture for metering a modular application on a device and securing the modular application, in accordance with an example implementation of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

Various implementations of the present disclosure describe techniques for securing and modular application in an IoT based computing environment.

According to an embodiment of the present disclosure, a system may secure, monitor and meter modular applications. Modular applications may refer to applications that may be running on local devices, such as IoT devices. In an example, the modular applications may be developed by third parties.

The modular application may be a discrete application, which perform device-specific functions, such as, for example, reading data from a particular hardware sensor. The modular application may also be implemented as a part of a distributed application to enable local decisions, protect sensitive information, or optimize some aspect of the distributed application, such as conserving bandwidth, reducing costs.

In examples, a system may generate a secure enclave and determine whether a modular application has been tampered with based on the system utilization information associated with a local device hosting the modular application. The system utilization information may be authenticated using a hardware encryption system such as, for example, the Trusted Platform Module. Also, the system can apportion system utilization across applications, users and the like based on the attested system utilization information.

Examples of the system can execute the modular application on a secure enclave on a local device. A secure enclave may be a software enclave or a hardware enclave. A secure enclave can create a protection region such that all operations are performed in a protected region, and all memory used in performing the instructions is encrypted. For example, a protected region can be generated within a processor, and all operations may be performed within the protected region, and the data may be encrypted and decrypted within the region. Thus, the system may secure the operation of the modular application in a hostile environment.

Further, examples of the system may generate an application or service by linking modular applications from multiple vendors on a device using secure enclaves and controlling the inputs and outputs of the distributed outputs. Thus, the system may mix and match modular applications separated in enclaves to generate any software or service.

Examples of the system may meter the system resource utilization of an edge device using a secure digital ledger or a distributed ledger. An edge device may be a device directly connected to a network of IoT devices and may have access to the cloud. In certain cases, the edge device may have an exclusive access to the cloud. The IoT devices on the network may not communicate directly to a cloud serve and may communicate with the edge device, which is authorized to communicate with the cloud server on behalf the IoT devices.

The secure digital ledger may understood to be a receipt for consumption measured by a trustworthy meter. The consumption may be recorded in a blockchain, and the edge device may emit a cryptographically reliable and unalterable ledger, viewable by a producer (an entity authoring the modular application), the consumer (an entity using the modular application), and a trusted service operator (an entity facilitating use of the modular application created by the producer for the consumer).

For example, the secure digital ledger may utilize a smartlet such as a smart contract to meter usage of a modular application. Furthermore, the root of trust may be used to protect the integrity of a device, the modular application running on the device, and the integrity and authenticity of the smartlet. In examples, the system may utilize a proof of elapsed time to determine the utilization of system resources. For example, the system may periodically request a wait time from a secure enclave. The secure enclave may include instructions to respond to requests for wait time. In examples, the processor may include instructions that respond to requests for wait time, with lower wait times corresponding to availability of system resources.

In other examples, the system may meter the resource utilization of a local device based on a proof of work consensus. The system may embed instructions to generate a proof of work hash when a modular application is executed in a secure enclave. The proof of work hash may include time of execution, resource utilization and may factor in a nonce, i.e., a random number. For example, a smart contract on a secure digital ledger may generate a random number and the proof of work hash may be generated including the time of execution, resource utilization, and the random number. The secure enclave may expend system resources in calculating the proof of work hash. In examples, the proof of work hash may be calibrated based on the system resources of the device running the modular application such as processing power, memory available, and the like.

In examples, the device running modular applications may store the time of execution and resource utilization in a distributed ledger. The distributed ledger enables tamper evident tracking of resource utilization on a local device running the modular applications. The system may meter and apportion the resource utilization using the distributed ledger.

Also, or in other examples, the system may utilize consensus techniques based on Nakamoto consensus or byzantine fault tolerance to generate a verifiable validation of the time of execution and resource utilization for the modular application in the secure enclave. Thus, the system may meter system utilization on a hostile local device, i.e., a device that may not otherwise be trusted for its authenticity.

In examples, the system may determine whether the modular applications on a local device are tampered based on the resource utilization on the local device that is cryptographically attested by a hardware encryption device, such as a trusted platform module.

Thus, the present disclosure provides for determining whether a modular application is tampered and also for accurate and reliable metering of resources/modular applications. Such a provision in turn may aid in bringing intelligence from cloud to local devices with appropriate metering. This also ensures modular applications and/or devices, which otherwise may not be trusted and may have limited use, are now easily used without any security related and authenticity related issues.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

FIG. 1 illustrates an example schematic illustration of a cloud-computing architecture 100 for metering and securing a modular application on a device. The cloud-computing architecture 100 implements aspects of the present disclosure. It will be appreciated components illustrated in FIG. 1 are only for illustration purposes and the cloud-computing architecture 100 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 1 includes a public network 102, a private network 104, and a dedicated network 106. The public network 102 may be, for example, a public cloud. The private network 104 may be a private enterprise network or private cloud, while dedicated network 106 may be a third party network or dedicated cloud. In this example, private network 104 may host a customer data center 110, and dedicated network 106 may host an Internet service provider 112. The hybrid cloud 208 may include any combination of the public network 102, the private network 104, and the dedicated network 106. For example, the dedicated network 106 may be optional with hybrid cloud 208 comprised of the public network 102 and the private network 104.

The public network 102 may include data centers configured to host and support operations, including tasks of a modular application. It will be appreciated that data center 114 and data center 116 shown in FIG. 2 correspond to an example implementation for accommodating one or more modular applications and is not intended limit the scope of use or functionality of embodiments of the present disclosure. The data center 114 and the data center 116 may not have any dependency or requirement related to any single resource, a combination of resources, a combination of servers (e.g. server 120, server 122, and server 124), a combination of nodes (e.g., nodes 132 and 134), or set of APIs to access the resources, servers, and/or nodes.

The data center 114 illustrates a data center comprising a plurality of servers, such as a server 120, a server 122, and a server 124. A fabric controller 126-1 may be responsible for automatically managing the servers 120-124 and distributing tasks and other resources within the data center 114. By way of example, the fabric controller 126-1 may rely on a service model, for example, designed by a customer that owns the modular application to provide guidance on how, where, and when to configure a server 122 and how, where, and when to place an application 128-1 and an application 128-2 thereon. The applications 128 may be modular applications. In an embodiment, one or more role instances of a modular application may be placed on one or more of the servers of data center 114, where the one or more role instances may represent the portions of software, component programs, or instances of roles that participate in the modular application. In another embodiment, one or more of the role instances may represent stored data that is accessible to the modular application.

Referring to the data center 116, the data center 116 may comprise a plurality of nodes, such as a node 132 and a node 134. Typically, each of the nodes 132 and 134 includes, or is linked to, some form of a computing unit (e.g., central processing unit, microprocessor, etc.) to support operations of the component(s) running thereon. The computing unit may be refer to a dedicated computing device with processing power and storage memory, which supports operating software that underlies the execution of software, applications, and computer programs thereon. In one instance, the computing unit is configure d with tangible hardware elements, or machines, that are integral, or operably coupled, to the nodes to enable each device to perform a variety of processes and operations.

In another instance, the computing unit may encompass a processor (not shown) coupled to the computer-readable medium (e.g., computer storage media and communication media) accommodated by each of the nodes.

Referring back to the data center 116, one or more virtual machines may run on nodes of the data center 116, such as, for example, a virtual machine 136 may run on the node 134. Although FIG. 1 depicts a single virtual node on a single node of the data center 116, any number of virtual nodes may be implemented on any number of nodes of the data center in accordance with illustrative embodiments of the disclosure.

The virtual machine 136 may be allocated to role instances of a modular application, or service application, based on demands, for instance, amount of processing load, placed on the modular application. The virtual machines 136 includes any software, application, operating system, or program that may be executed by a processing unit to underlie the functionality of the role instances allocated thereto. Further, the virtual machine 136 may include processing capacity, storage locations, and other assets within the data center 116 to properly support the allocated role instances.

In operation, the virtual machines, such as the virtual machine 136, may be dynamically assigned resources on a first node, such as the node 132 and a second node of the data center 116, and endpoints (e.g., the role instances) are dynamically placed on the virtual machines 136 to satisfy the current processing load. In one example, a fabric controller 126-2 of the data center 116 may be responsible for automatically managing the virtual machines 136 running on the nodes of data center 116 and for placing the role instances and other resources (e.g., software components) within the data center 116. By way of example, the fabric controller 126-2 may rely on a service model (e.g., designed by a customer that owns the service application) to provide guidance on how, where, and when to configure the virtual machines, such as virtual machine 136, and how, where, and when to place the role instances thereon.

As discussed above, the virtual machines may be dynamically established and configure d within one or more nodes of a data center. As illustrated, the node 132 and the node 134 may be any form of computing devices, such as, for example, a personal computer, a desktop computer, a laptop computer, a mobile device, a consumer electronic device, server(s) and the like. In one instance, the nodes 132 and 134 host and support the operations of the virtual machines, while simultaneously hosting other virtual machines carved out for supporting other tenants of the data center 116, such as internal services 138 and hosted services 140. Often, the role instances may include endpoints of distinct service applications owned by different customers.

The role instances that reside on the nodes 132 and 134 support operation of service applications and may be interconnected via application programming interfaces (APIs). In one instance, one or more of these interconnections may be established via a network cloud, such as the public network 102. The network cloud serves to interconnect resources, such as the role instances, which may be distributable placed across various physical hosts, such as nodes 132 and 134. Also, the network cloud facilitates communication over channels connecting the role instances of the service applications running in the data center 116. By way of example, the network cloud may include, without limitation, one or more local area networks (LANs) and/or wide area networks (WANs).

Figure 2:
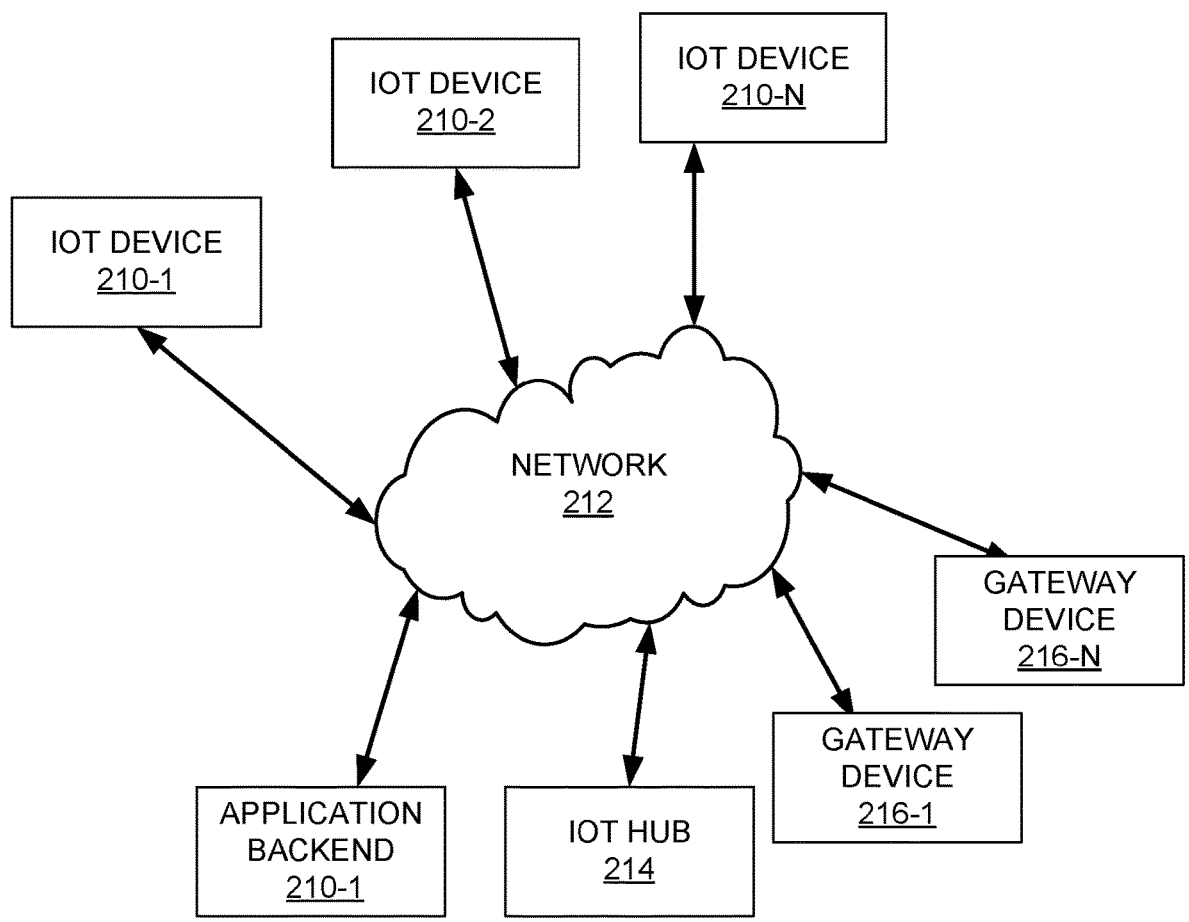
FIG. 2 illustrates a block diagram illustrating an example system for IoT data control, in accordance with an example implementation of the present disclosure.

FIG. 2 is a block diagram illustrates various components of a system 200 for monitoring and securing modular applications associated with IoT devices 210, according to an example implementation of the present disclosure. The system 200 may include a network 212 connecting various components such as, for example, an IoT hub 214, one or more IoT devices 210-1, 210-2, . . . 210-N, one or more gateway devices 216-1 . . . 216-N, and an application backend 218.

The IoT devices 210 and the gateway devices 216 are examples of edge devices and the IoT hub 214 may be in the cloud. The IoT device 210 may refer to a device intended to make use of IoT services. The IoT device 210 may include virtually any device that may be capable of connecting to the cloud to use IoT services or for any other purpose. The IoT devices 210 can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

The application backend 218 refers to a device, or multiple devices such as a distributed system, that may perform actions that enable data collection, storage, and/or actions to be taken based on the IoT data, including user access and control, data analysis, data display, control of data storage, automatic actions taken based on the IoT data, and/or the like. In one example, the application backend 218 may be implemented as one or more virtual machines 136 deployed in the public cloud 202 or the private cloud 204 described in FIG. 2 above. In some examples, at least some of the actions taken by the application backend 218 may be performed by applications running in application backend 218.

The IoT hub 214 may refer to a device, or multiple devices such as a distributed system, to which, in some examples, IoT devices connect on the network for IoT services. In some examples, the IoT hub 214 is excluded, and the IoT devices 210 communicate with the application backend 218, directly or through one or more intermediaries, without communicating with an IoT hub 214. Users of the IoT devices 210 may receive IoT services via communication with an IoT service solution.

The IoT solution service is not limited to one particular type of an IoT service, but may also refer to a device to which the IoT device communicates, after provisioning, for at least one IoT solution or IoT service. Thus, the IoT solution service may refer to any IoT solution. The IoT solution service may be, in various examples, the IoT hub 214 or the application back-end (e.g., the IoT solution service may be a software component in the application back-end). For example, in cases where IoT hub 214 is included, the IoT hub 214 may act as the IoT solution service. In other examples, where IoT hub 214 is excluded from system 200, the application backend 218 may act as the IoT solution service. Further, the IoT hub 214 may refer to the portion of the IoT solution/IoT service to which provisioned IoT devices communicate.

Each of the IoT devices 210, the gateway devices 216, and/or the device that comprises IoT hub 214 and/or application backend 218 may be implemented as a computing device or using a hardware platform as described later. The communication between the IoT devices 210 and one or more application backends 218 may occur with an IoT hub 214 as an intermediary.

Referring to the network 212 connecting various components of the system 200, the network 212 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

The network 212 may include various other networks such as one or more networks using local network protocols such as 6LoWPAN, ZigBee, or the like. Some IoT devices may be connected to a gateway device via a different network in network 212 than other IoT devices. Thus, the network 212 may include any communication method by which information may travel between the IoT hub 214, the IoT devices 210, the gateway devices 216, and the application backend 218. Although each device or service is shown connected as connected to network 212, all the devices need not be communicating with each other. In some examples, some devices/services shown only communicate with some other devices/services shown via one or more intermediary devices, e.g., edge devices.

Further, it will be appreciated that the network 212 may implemented as a single network or a combination of multiple networks that may or may not be connected with each other. In case of multi-network configuration, some of the devices may communicate with each other using one network, while few others may communicate through a different network.

In operation, the IoT devices 210 are devices that are intended to make use of IoT services provided by the IoT solution service, which, in some examples, includes one or more IoT hubs, such as IoT hub 214. The application backend 218 includes a device or multiple devices that perform actions in providing a device portal to users of IoT devices. Optional gateway devices 216 are devices that may be used by some of the IoT devices 210 for accessing the IoT hub 214. In some examples, after provisioning, some or all of the IoT devices 210 communicate to IoT hub 214 without using an intermediary. In other examples, some or all of the IoT devices 210 communicate with IoT hub 214 using an intermediary device such as one or more of gateway devices 216. The application backend 218 is a service that may be used by users of IoT devices to manage IoT services for IoT devices including IoT device 210.

Figure 3:
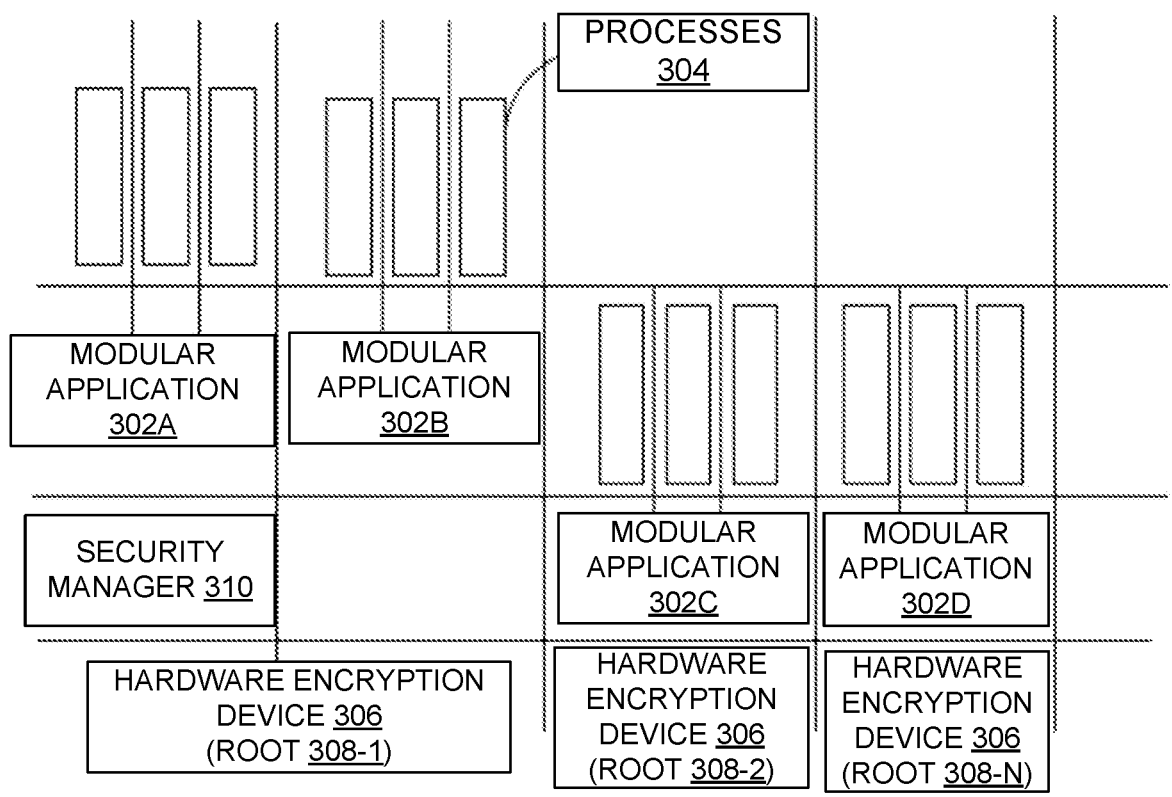
FIG. 3 illustrates an exemplary block diagram of a modular application, according to an example of the present disclosure.

FIG. 3 is an example block diagram of a modular application 302, according to an example implementation of the present disclosure. Examples of modular applications may include artificial intelligence applications, machine learning applications and the like. For purpose of explanation, and not as a limitation, various instances 302A-302D of the modular application 302 or various applications 302A-302D are illustrated running on an edge device, such as an IoT device 210. In an example, the instances 302A, 302B, 302C and 302D may be different instances of the same applications. In other examples, instances 302A, 302B, 302C and 302D may be instance of different applications.

The modular application 302 and/or processes 304 are shown separated in secure enclaves, in accordance with an example. A secure enclave may create a protection region such that all operations are performed in a protected region, and all memory used in performing the instructions is encrypted. The modular applications 302 and processes 304 are shown separated by horizontal lines and vertical lines. For sake of explanation and not as a limitation, the horizontal lines may indicate the separation between parents and children, while the vertical lines may indicate the separation between virtual machine instances or modular applications executed on multiple edge devices.

In one example, the edge devices may implement the secure enclaves either in hardware or software. For example, a modular application manager (shown in FIG. 6) may include set of policies to implement varying levels of secure enclaves using root of trust and a hardware encryption device 306 such as a trusted platform module (TPM). In the edge device, the hardware encryption device 306 may allow attestation of the platform to external entities. For example, the external entities may receive confirmation that the edge device has not been tampered. This may mean that there is no modification of the firmware, that the operating system running on the device has not been modified and the like. This may enhance reliability of the modular applications 302, which may otherwise not be trusted by a consumer.

In examples, the edge device may generate the secure enclaves using the hardware encryption device 306, such as a TPM chip. The TPM chip and/or the secure enclave may protect the integrity of the firmware of the IoT chip/device, integrity of the operating system, confidentiality and integrity of application code and data, allow a trusted path to the user and confidentiality of user data, and/or secure channels to devices or between applications may be implemented.

For example, the edge device may include a hardware encryption device 306 used to generate a root of trust 308, interchangeably referred to as root. In other devices, the hardware encryption device 306 may generate other roots of trust 308-1, 308-2, and the like. In examples, the hardware encryption device 306 may include a root of trust 308 issued by the manufacturer of the device embedded in hardware that cannot be accessed other than by the hardware encryption device 306. The root of trust 308 may be one or more cryptographic signing keys. The cryptographic signing keys of the hardware encryption device 306 may be authenticated by the certification authority (shown in FIG. 5), such as the device manufacturer. The certification authority may maintain a list of secure devices and the level of security. For example, the secure devices may include separate hardware to isolate the memory and perform all the computation within hardware, which cannot be accessed by other applications or firmware in the edge device.

The secure enclaves that are isolated and use specialized hardware may be accorded the highest level of trust in the database of the certification authority. In examples, the certification authority such as device manufacturers may accord a lower level of trust to edge devices with a hardware encryption device 306, which relies on the general processor, and memory of the edge device to create secure enclaves. In other examples, a specialized processor may include hardware instructions that isolate the memory and the operations and securely encrypt the operations and the memory from other applications and the operating system. These specialized processors may allow dynamic creation of secure enclaves that have the highest level of trust, which may be detailed in the database of the certification authority.

In an example, the hardware encryption device 306 may generate the root of trust 308, which is anonymous based on direct autonomous attestation. The anonymous root of trust may include one or more cryptographic keys, such as a public key-private key pair. In the anonymous root of trust, the cryptographic keys are generated without a certification authority. In examples, a secret number may be generated by a hardware encryption device 306 and the secret number may then be used to generate a direct anonymous attestation key transmitted to a direct anonymous attestation issuer. Further, it may be verified to the direct anonymous attestation issuer that a hash was created using the secret number known only to the hardware encryption device 306, which isn't shared with the direct anonymous attestation issuer.

The direct anonymous attester also generates a hash to prove that the direct anonymous attester also computed the hash verifiable without a third party trusting the direct anonymous attester. For example, the direct anonymous attester may generate a nonce and transmit the nonce to the hardware encryption device 306, which may generate the hash after computation to satisfy the nonce rules. The direct anonymous attestation key may then be used to sign the attestation keys generated by the hardware encryption device 306 used for authentication. The attestation keys generated by the hardware encryption device 306 are indistinguishable from a key generated from another hardware encryption device 306 and may be used where the edge device identity and location may need to be secret.

In an example, the hardware encryption device 306 may use the attestation keys signed with the direct anonymous attestation key or the attestation keys verifiable by the certification authority to attest to a hash of a file, contents of a memory, the state of the operating system, state of a process, the state of registry entries, the state of processes, permissions of process, access permissions and/or the like. In the case of direct anonymous authorization, the hardware encryption device 306 may generate a hash of content being certified, determine a signature based on the attestation identify key, the verifier and time. The hardware encryption device 306 may also determine a computational solution, which establishes that the hardware encryption device 306 possesses: (i) a direct anonymous attestation key signed with the signature of an issuer; and (ii) the attestation identity keys, verifier information and time of verification signed using the direct anonymous attestation key. The verifier such as the security manager may verify the hardware encryption device 306 and the state. Additionally, compromised hardware encryption devices may be identified based on the time of request and based on whether multiple requests are received from the hardware encryption device 306 for verification. Further, compromised hardware encryption device may be blacklisted.

In an example embodiment, the modular-application manager may use the hardware encryption device 306 to generate the secure enclaves. The secure enclave may be generated such as the one surrounding the modular application instance 302A and 302B, using a set of security policies. For example, the set of policies (shown in FIG. 6) may include policies such as evidence of the software stack. Evidence of the software stack may include the firmware, OS, applications running on the edge device or the like. The hashes allow the modular application manager to determine an integrity measurement of the edge device.

Also, the modular application manager may use the hardware encryption device 306 to generate secure enclaves using remote system policy enforcement. Examples of the remote policy include the permissions of executables, the permissions of modular applications, the permissions of operating system processes, and can be extremely granular. In examples, the policy enforcement may include metering of system resource utilization, the active time spent by the modular application processing data, the amount of CPU utilized, the resource utilization requests from other applications, denied requests from other applications, the amount of data consumed by the modular application, the amount of output produced by the modular application, and the intensity of the processing and memory utilization and the like. In examples, the application manager 506 may receive a log with a certified log trail of the system resource utilization to determine the allocation of metering to each specific user, application or the like.

In an example, the modular application manager may secure the states of the operating environment, monitor any malicious interaction between the processes, security policies of the modular application manager and the like. In an example, the hardware encryption device 306 may lock access to all processes except those permitted by the set of policies of the modular application manager before generating the child modular applications such as 302A. In other examples, the modular application manager may deploy a security manager 310 to delegate real-time security and metering policy for secure enclaves. The security manager 310 may generate the child modular applications such as 302A. In examples, creating a child modular application 302A provides an abstraction layer away from the rest of the memory and may store the data in encrypted locations in the memory in secure archives in a hostile edge device. In other examples, the modular application manager may generate secure enclaves by securing the processes of an application, the memory used for execution of the applications, permission of files including executable files and the like. The TPM may encrypt the process and memory utilized by an application to minimize the risk of a data breach.

In an example implementation, the edge device may run the modular application 302A in secure enclaves and results of the execution may be received by the security manager 310. The security manager 310 may then use these results as inputs for a second modular application instance 302C. Thus, the edge device may allow modular application instances 302A and 302C to transfer data between each other while being enclosed in respective secure enclaves to prevent tampering of the code.

Further as shown, the processes 304 may be isolated, within the modular applications using security policies to prevent malicious code alterations to the executable inside an archive. For example, processes 304 may be isolated from other processes to process data received from a third party modular application instance 302A. In examples, the modular application manager may isolate the modular applications over one or more edge devices.

In an example, the hardware encryption device 306 may allow communication between the two modular applications, example instance 302B and 302C directly based on the set of policies. For example, the modular application 302A may run threads or processes that are isolated from each other as shown in FIG. 3, above the modular application 302A running in their space. Thus, the modular application manager may use the hardware encryption device 306 to monitor, administer, and control secure enclaves. The secure enclaves may allow data segregation between modular applications, between a modular application and the operating system, for code, memory and/or both when the modular applications are executed.

In an example, the security manager 310 may be implemented as a parent application. In other examples, the security manager 310 may be implemented on a fabric device 218. In examples, the modular application 302A running on top of the parent application such as the parent modular application may further create additional secure enclaves using a secure channel through the security manager 310. The hardware encryption device 306 may allow secure communication to prevent the security manager 310 from eavesdropping on the communication. Thus a modular application manager may monitor, administer and maintain modular applications in a secure environment.

The modular application manager may allow resource utilization metering and metrics. The resource utilization monitoring may allow the edge devices to generate invoices based on actual utilization of system resources, the actual time of operation of the modular application, the amount of data processed by the modular application, the amount of output of the modular application, and the like. In an example, the modular application manager may determine statistical variations in usage patterns and log any attempts the modular application makes to interact with other processes or retrieve data from memory allocated to other processes and the like.

Figure 4:
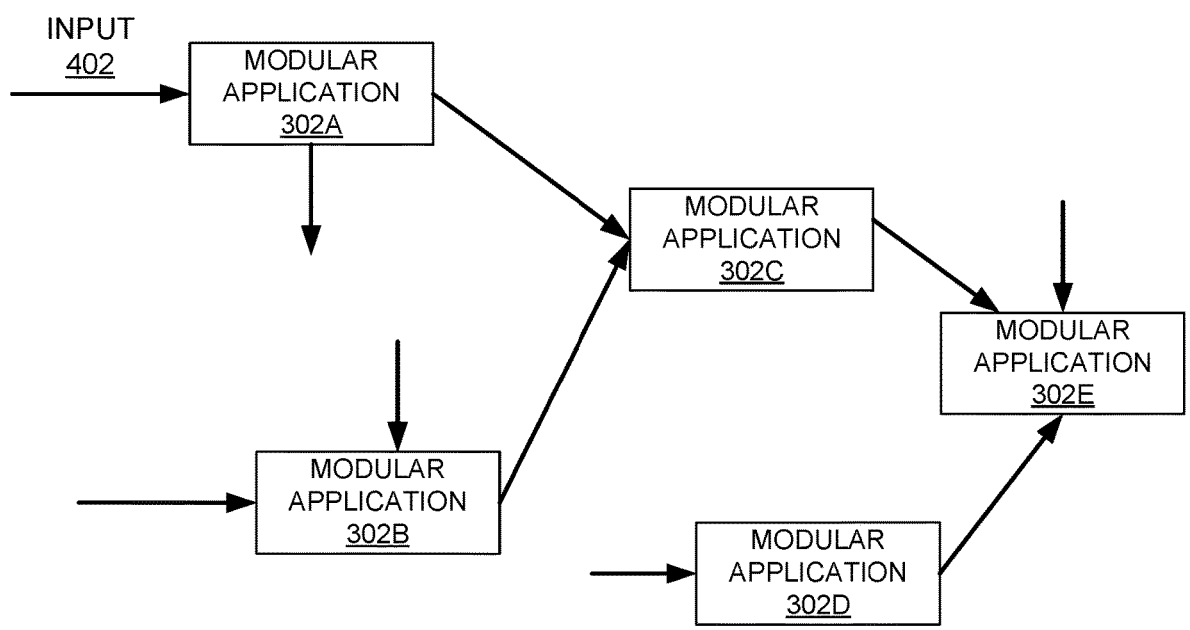
FIG. 4 is an exemplary block diagram of a combination of modular applications for generating a service or software from modular applications in secure enclaves, according to an example of the present disclosure.

FIG. 4 is an exemplary block diagram of a combination of modular applications 302 for generating an integrated modular application, according to an example implementation of the present subject matter. In an example, the integrated modular application may be provided as a service to a consumer. In examples, the modular application instance 302A may receive an input 402 from the modular application manager, when running in a secure enclave and output data to the modular application manager. The modular application manager may then use the output data as an input to the modular application 302E. The modular application 302A and the resource utilization details may be audited.

The modular application instances 302 may be used to create any service or software as required. For example, such an integrated modular application may be generated for a large industrial machine. The machine may be equipped with several different sensors, which may measure parameters, such as temperature, revolutions, viscosity, pressure, travel, etc. Each sensor may send data to a different modular application instance. Another modular application instance may aggregate and analyze the data to identify patterns that may indicate imminent failure. On identification of such a pattern, the modular application may send an alert to a control application, which may also be modular. Further, the control application may safely shut down the machine on receiving the alert. The system implementing the modular applications may also forward the alert to the cloud server, but the collection, analysis, and control happen locally to prevent catastrophic failure.

Such a modular approach to modular applications may secure the integrity of the operating system, integrity of one or more instance of the modular applications 302, integrity of the algorithms and secrets in one or more modular applications 302, integrity of individual threads of one or more modular applications 302, integrity of a memory location used by the modular applications 302 and/or preventing access or determining rogue applications and the like.

Figure 5:
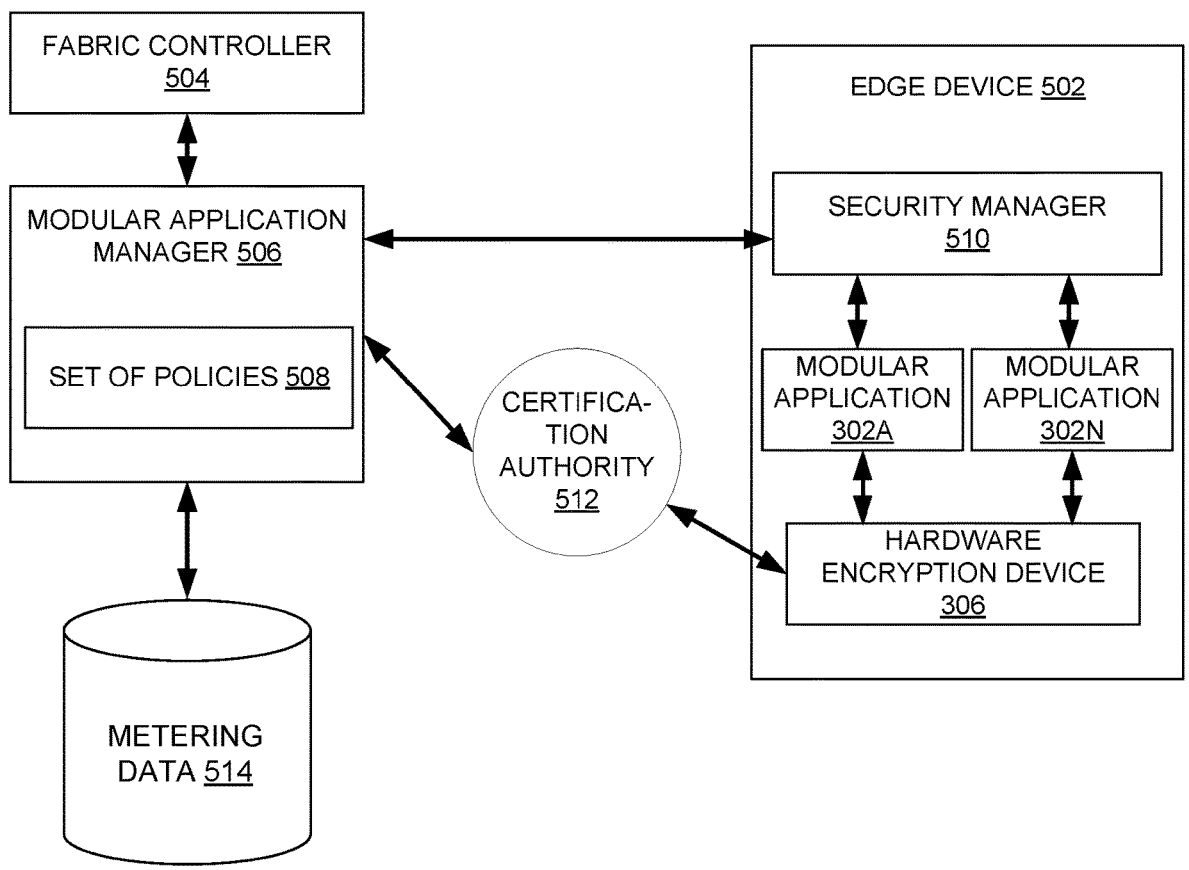
FIG. 5 is an exemplary block diagram of a computing system for monitoring, metering detecting tampering of the modular application based on system utilization, in accordance with an example implementation of the present disclosure.

FIG. 5 illustrates an example block diagram of a computing system 500 for metering system utilization and monitoring modular application tampering based on system utilization, according to an example implementation of the present disclosure. The computing system 500 may provide for metering system utilization on an edge device 502. Also, the computing system 500 may monitor, administer, and meter modular application tampering in local devices, while the local device may run in a hostile environment, in conjunction with applications from third-party sources. The computing system 500 may be implemented in a public cloud, a private cloud, a hybrid public and private cloud, a distributed computing system or any other type of system including a plurality of nodes hosting application instances.

In an example, a fabric controller 504 may implement a modular application manager 506. Further, a security manager 510 may be implemented on one or more edge devices 502. The edge devices 502 may host one or more modular applications 302 on a local device 308. Although, a single local device, such as an edge device 502 is shown, it will be appreciated that the computing system 500 may include a plurality of local devices, with each device hosting one or more applications.

In system utilization monitoring, the fabric controller 504 may use a modular application manager 506 and set of policies 508 to create secure enclaves and/or monitor secure enclaves on the edge device 502. The set of policies 508 may include, for example, policies on securing the edge device 502, policies for metering the usage of the edge device 502, policies for metering the usage of the modular applications 302, policies for permissible interactions between modular applications 302, other applications and limitations and the like.

In an example embodiment, the fabric controller 504 may delegate the security policy to a security manager 510 of the edge device 502. The security manager 510 may be implemented as a service or application installed on the edge devices 502. In other examples, the security manager 510 may be implemented on the fabric controller 504. The security manager 510 may secure the application as described with reference to FIG. 4 above. In examples, the security manager 510 may secure the modular application 302A by securing the processes and memory used by the modular application 302A using the hardware encryption device 306. When required, the security manager 510 may secure the modular application 302A in secure enclaves as discussed above with reference to figures above.

When the security manager 510 is not present, the modular application manager 506 may administer, manage and meter the modular application 302A based on an accreditation approach. In an accreditation approach, the modular application 302B may be required to implement certain modules or instructions to authenticate itself. The modular application manager 302B may send an accreditation request to the edge device 502 for accreditation of the modular application. In an example, the hardware encryption device 306 of the edge device may perform the accreditation.

In examples, an accreditor (not shown in figures) of the modular application 302B may generate a public key and a private key and request the hardware encryption device 306 to certify the public key and private key pair. The hardware encryption device 306 may generate a hash of the application, and generate a certification including the public key of the modular application and the hash, and sign the certification using the hardware encryption device's attestation identity key.

The accreditor of the modular application 302B may be required to authenticate in a variety of scenarios, for example, when requested by the modular application manager 506, periodically, when the modular application starts up, when modular application requires authorization to continue to operate or authorization to increase system utilization. For authentication, the accreditor may require additional information, access other application processes and the like, and send the certificate of its public key along with the hash value and the certificate issued by the hardware encryption device 306. The modular application manager 506 may verify the certificate chain using a certification authority 512, such as device manufacturer. In examples, the modular application 302B may use direct anonymous attestation as described above with reference to FIGS. 3 and 4.

In an example, the modular application manager 506 may authorize the change or acknowledge authentication. In other examples, the modular application manager 506 may request additional information from the modular application 302A. The modular application 302A may provide additional information, such as attest the system utilization logs or system security details, software stack integrity and the like using a nonce generated and provided by the modular application manager 506. The modular application 302B may request the hardware encryption device 306 to generate a proof of computation using the nonce and a secret value generated by the hardware encryption device 306 similar to the direct anonymous attestation described hereinabove. The hardware encryption device 306 may include hashes of system utilization logs, system security policies, system state information, system memory hashes and the like along with a proof of computation.

In an example embodiment, the security manager 510 may generate a hash of the executable of the modular application 302, a hash of the memory, and the intermediate states of the modular application 302A. The hardware encryption device 306 may generate a certification including the hash and the public key and sign the hash with its attestation identity key. The security manager 510 may transmit the certification to the modular application manager. In examples, the security manager 510 may transmit the certification issued to the hardware encryption device 306 by a trusted certification authority 512 in addition to the certification issued by the hardware encryption device 306.

The modular application manager 506 may verify the trustworthiness of the modular applications 302, the edge device 502, the software stack and the like by verifying the certificate chain. For example, the hardware encryption device's authenticity may be verified based on the certificate issued by the certification authority 512. The modular application manager 506 may look up the hash received against a database, which maps hash values of hardware encryption devices to trust levels.

The hardware encryption device 306 may be implemented as discrete devices, integrated devices, firmware devices and/or software devices. The local device may implement the hardware encryption device using any of these methodologies. Discrete hardware encryption device may provide the highest level of security. For instance, the discrete TPM chip is designed, built and evaluated for the highest level of security that can resist tampering. The integrated hardware encryption device may be integrated into a chip that provides functions other than security. The hardware implementation makes integrated hardware encryption device more secure compared to software-only solutions. The firmware based hardware encryption device may be implemented in protected software. The code in firmware hardware encryption device may be run on the main CPU, and a separate chip may not be required. The firmware hardware encryption device may be run in a protected execution environment called trusted execution environment (TEE) that is separated from the rest of the programs that are running on the CPU. TEE separate private keys, and the like that may be required by the TPM, to secure from hacks. However, the TEE security may depend on the TEE operating system, bugs in the application code running in the TEE, and the like. The hardware encryption device may also be implemented as a software emulator of TPM.

In an example embodiment, the modular application trust level may be based on the type of the hardware encryption device available on a local environment. In examples, the security manager 510 may use the hardware encryption device to perform, platform attestation to external entities; integrity protection of the operating system and underlying architecture; confidentiality and integrity protection of application code and data during execution; confidentiality and integrity protection of application code and data during storage; a trusted path to the user such that confidentiality of user input can be assured, and/or secure channels to devices and between applications to ensure confidentiality, integrity and authenticity of communicated data.

In an example implementation, the hardware encryption device 306 may generate a hash value of the executable code of the modular application and the state of the modular application, i.e., data during execution. The state of the modular application may include the contents of the memory during execution of the modular application.

In one example, once the modular application and or the edge device authenticated and no tampering is detected, the metering may be performed and observed data may be stored in metered data 514.

Figure 6:
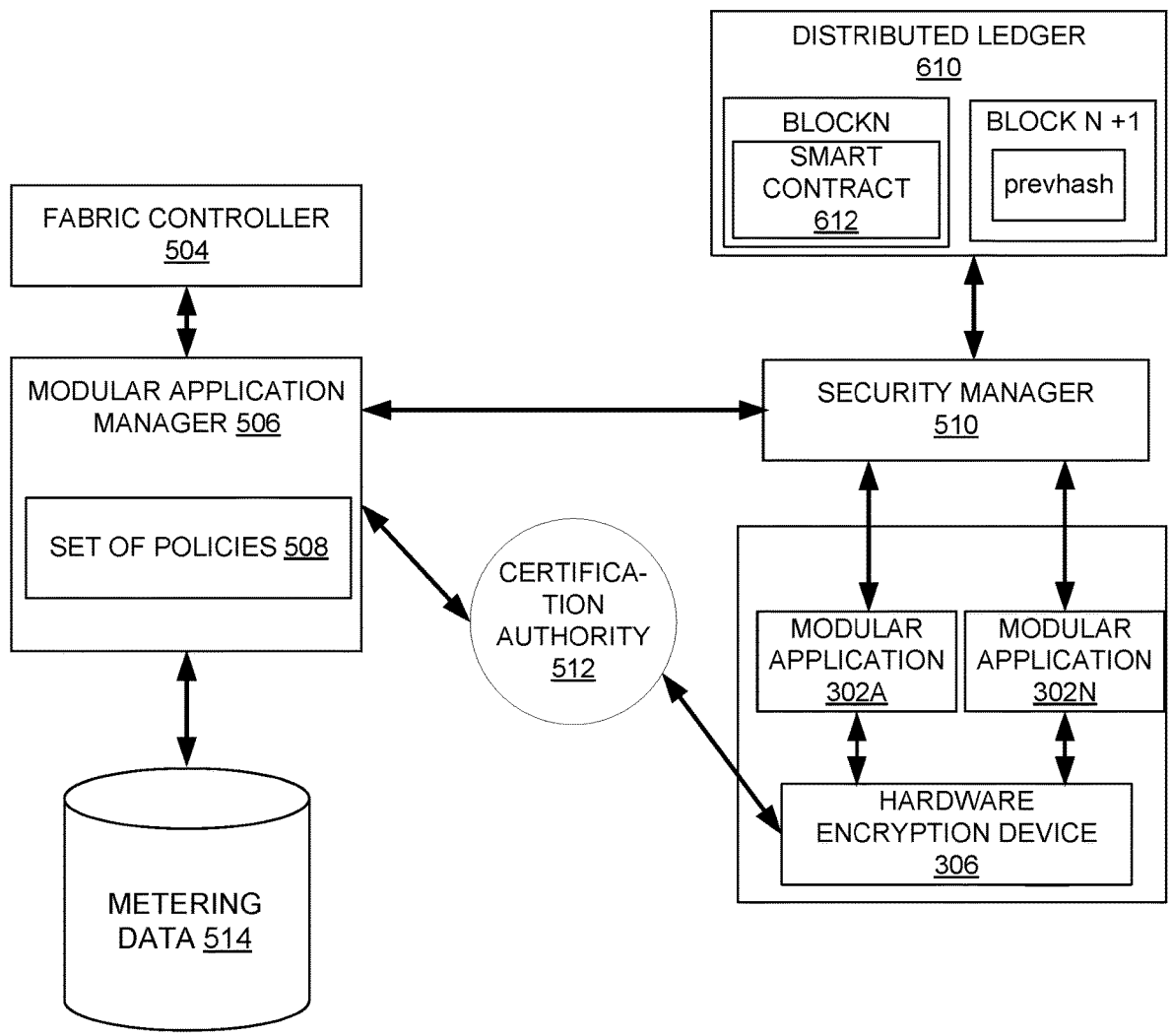
FIG. 6 is an exemplary block diagram of a computing system for monitoring, administering, tampering detection and/or metering of the modular applications on an edge device, in accordance with an example implementation of the present disclosure.

FIG. 6 illustrates an example block diagram of a computing system 600 for monitoring, administration, tamper detection, and/or metering of the modular application 302 on an edge device, such as the edge device 502, according to an example implementation of the present disclosure. FIG. 6 illustrates utilization of a distributed ledger 610 such as blockchain to administer modular applications on the edge device 502. In examples, the modular application manager 506 may delegate some or all of the set of policy administration to the security manager 510. The security manager 510 is shown outside the edge device 502 but in other examples the security manager may also be deployed inside the edge device 502 as described above. Examples of the monitoring, administration and tampering detection of the modular application on an edge device may be performed using distributed ledgers, such as blockchains.

Although monitoring, administration and tampering detection has been explained in considerable detail with respect to blockchains, it will be appreciated that other forms of smart ledgers and distributed ledgers may also be used. Accordingly, principles described with respect to blockchains may be applied to such distributed ledgers as well.

In an example, on using the blockchains, cryptographically proofed transactions are added to a new block on the blockchain to create a distributed ledger, which prevents double spending without using intermediaries. As described herein, double spending may be related to modular applications claiming resource utilization, input processing or output generated, when the system resources or the modular application on the edge device were used elsewhere.

In some blockchain implementations, one or more smartlets. e.g., a smart contract 612 may be deployed on the blockchain or the distributed ledger 610. When deployed, the smartlet may be assigned a unique address to allow communication through messages. The smartlet may be deployed by storing the smartlet as a transaction on the blockchain. The messages to the smartlet may be posted as transactions on the blockchain. The smartlet may contain code and data designed to execute on the virtual machines. The smartlet may have the ability to read or write to its internal storage storing data, read the storage of a received message, send messages to other smartlets to trigger execution of the code in other modular applications.

In an example implementation, when the smartlet is executed on a virtual machine of the peers securing the blockchain, the resulting data may be saved in the internal storage of the smartlet, and the updated smartlet may be stored as a transaction on the blockchain. Thus, the smartlet and changes to data, i.e., state of the smartlet, may be represented as a series of transactions on the blockchain. Each block in the blockchain is secured by peers based on a consensus protocol.

The smartlet may allow the administration and enforcement of some or all of the obligations and liabilities of the accounts such as users that may interact with the smartlet. The smartlet may use a type of smartlet called utility smartlets to provide a library of functions to other smartlets. In an example, a utility smartlet may obtain updates on conditions that may affect the obligations and liabilities of the parties to the smartlet such as the latest security threats affecting edge devices.

In one example, the security manager 510 may be implemented as the smart contract 612. The smart contract 612 may include the security policies for the modular application 302A on the edge devices 502. The smart contract 612 may include code to authenticate the signed messages, code to generate secure and/or administer secure enclaves and the like.

The smart contract 612 may include the security policy for the modular application 302A. For example, the security policy may list the processes or functions of the operating system accessible to the modular application 302A on the edge device 502, the security policy required to generate a secure enclave on the edge device 502, and the like. The smart contract 612 may include logic to authenticate the hashes signed by the hardware encryption device 306 from the edge device 502. The smart contract 612 may also include code to record an audit trail of the modular application 302A on the blockchain. In examples, the smart contract 612 may record only the hashes on the blockchain.

In an example implementation, the smart contract 612 may record the hashes and the data on the blockchain. For example, the smart contract 612 may include code to generate a nonce to challenge the modular application 302A. The nonce challenge may require the hardware encryption device 306 to produce computational proof using a secret key known only to the hardware encryption device 306. In an example, the smart contract 612 may use a distributed anonymous authentication as described above to send a computational proof of possession of a secret key such as a number. The smart contract 612 may verify the existence of the secret by responding with a nonce. The hardware encryption device 306 may return a computational proof including the nonce to authenticate the hardware encryption device 306.

In examples, the smart contract 612 may include logic to perform some or all of the functions of the modular application manager described above with reference to FIG. 5. The modular application manager 506 or another application may retrieve the entries from the blockchain to determine the utilization. For example, the fabric controller 504 may periodically retrieve the information from the blockchain to identify relevant transactions and meter the usage of the modular application 302A and the like. The modular application manager 506 may store the information received in a database such as metering data 514. In examples, the modular application manager 506 may use the audit trail on the blockchain to flag suspicious actions of modular applications 302 on edge devices 502A.

Also, other blockchain implementations such as consortium blockchains, blockchains with the centralized hub, different versions of the same blockchain, etc., may be used to meter the system utilization. Metering the system utilization may allow proportionate share of bills for different projects, different applications. For example, the modular application manager 506 may have different rates for peak and off-peak execution of modular applications. In other examples, the modular application manager 506 may impose caps on monthly usage or maximum payment caps and the like. Also, the modular application manager 506 may charge different prices based on a surge in demand when the modular application 302A is started. In examples, the modular application manager 506 may charge different prices based on the volume of input or output data to a modular application, utilization of central processing unit, utilization of memory on the edge device, feature set utilized during execution, such as more advanced feature sets may require an additional premium and/or the like. In examples, the blockchain may be used to automatically settle payments for utilization of the modular applications 302.

Figure 7:
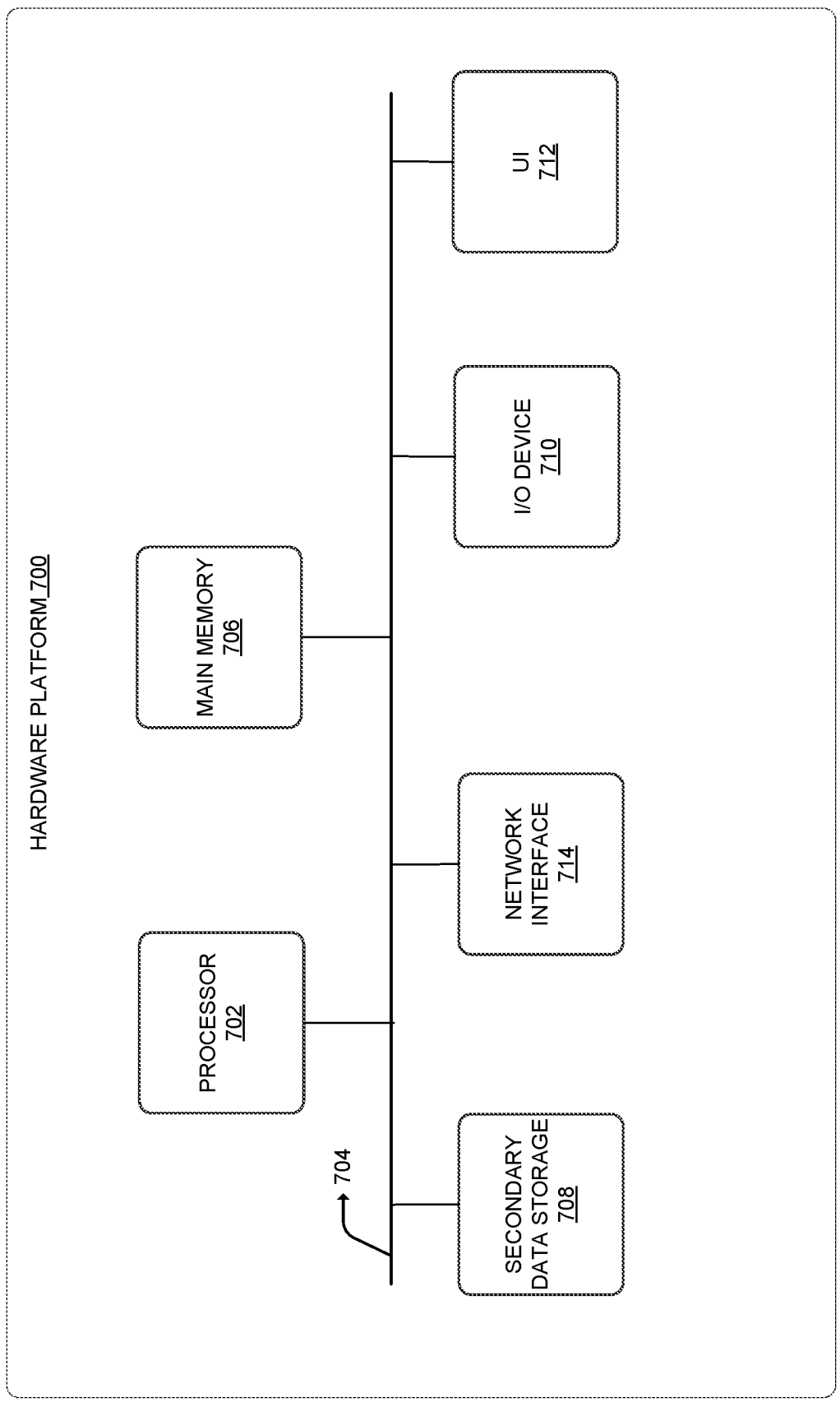
FIG. 7 illustrates a block diagram of a hardware platform for the present disclosure, in accordance with an example implementation of the present disclosure.

FIG. 7 illustrates a hardware platform 700 for implementation of the nodes 132 and 134, the system 200, the IoT hub, the edge device 502, and other computing devices recited above, according to an example of the present disclosure. In an example embodiment, the hardware platform 700 may be a computing device for implementing various described herein. The computing device may represent a computational platform that includes components that may be in a server or another computing device. In an example embodiment, the computing device may include, but is not limited to, a laptop, a desktop, and a smartphone. The computing device may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computing device may include a processor 702 that may implement or execute machine readable instructions for performing some or all of the methods, functions, techniques and/or other processes described herein. Commands and data from the processor 702 may be communicated over a communication bus 604. The computing device may also include a main memory 706, such as a random access memory (RAM), where the machine readable instructions and data for the processor 702 may reside during runtime, and a secondary data storage 708, which may be a non-volatile memory and may store machine readable instructions and data. The main memory 706 and the data storage 708 are examples of non-transitory computer readable mediums. The main memory 706 and/or the secondary data storage 708 may store data used by the computing systems described above, such as an object repository including web objects, configuration data, test data, etc.

The main memory 706 and/or the secondary data storage 708 may store, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade, or may share and/or aggregate data between client-side services and cloud services.

The computing device may include an Input/Output (I/O) 7, such as a keyboard, a mouse, a display, etc. The input/output device 710 may include a user interface (UI) 612 for interacting with a user of the system 102. The UI 712 may operate with I/O device 710 to accept from and provide data to a user. The computing device may include a network interface 714 for connecting to a network. Other known electronic components may be added or substituted in the computing device. The processor 702 may be designated as a hardware processor. The processor 702 may execute various components of the system 102 described above and perform the methods described below.

FIG. 8 shows a flowchart of a method 800 for securing and monitoring a modular application, according to an example embodiment of the present disclosure. The various systems described above may execute the method 800 to secure and monitor modular applications 302. The method 800 and other methods and operations described herein may be performed by one or more servers or other types of computers including at least one processor executing machine-readable instructions. Also, one or more of the operations of the method 800 and operations of other methods described herein may be performed in a different order than shown or may be performed simultaneously or substantially simultaneously. The methods may be stored in a non-transitory computer-readable medium with machine-readable instructions.

At block 802, accreditation of at least one of a modular application and an edge device hosting the modular application may be initiated. In an example implementation, the modular application manager 506 may send an accreditation request to the edge device 502 for accreditation of the modular application 302. In the alternative, the modular application 302 may request approval from the modular application 302 when the modular application 302 is starting; the modular application requires a system resource allocation higher than the current utilization, the modular application 302A requires access to a system resource or a different modular application. In another example implementation, the modular application manager 506 may request accreditation of the edge device 502 to verify the integrity of the edge device, the integrity of the software stack and the like.

In examples, the accreditation request may include a policy set to generate a secure enclave for the modular application 302. For example, the policy set may determine the processes, services and other system resources on the edge device 502 the modular application 302A may utilize. Also, the policy may require the secure enclave be generated before the modular application 302 is executed. Also, the policy may provide a set of applications that may not be executed when the modular application 302 is executing. For example, a debugger may not be active during execution of modular applications belonging to a third party.

At block 804, accreditation information for the modular application may be received. In an example, the modular application manager 506 may receive accreditation information for the modular application 302A from the security manager 510. In one example, the security manager 510 may be implemented on the edge device as software or a service. The security manager 510 may determine the accreditation information based on accreditation information received from the hardware encryption device on the edge device 502. In an example, the accreditation information may include a hash of the modular application 302, signed using the attestation key of the hardware encryption device.

In one example, the accreditation information may include hash of the application binary cryptographically signed with a cryptographic key, hash of memory content of the edge device signed with a cryptographic key, hash of a modular application log signed with a cryptographic key;

and hash of the software stack on the edge device associated with the modular application.

At block 806, an accreditation status of the modular application may be monitored. The accreditation status may be current application instance state, which may be periodically compared against known-good/trusted state information. In an example implementation, the modular application manager 506 may monitor the accreditation status of the modular application 302 during execution of the modular application 302.

In one example, the modular application manager 506 may determine the accreditation status of the modular application 302 based on the information received from the security manager 510. The modular application manager 506 may determine whether the modular application has been tampered based on the accreditation results. For example, a static portion of the application binary data may be measured and saved before it is loaded into memory. Then the measurements of the same data may be taken from memory. In case the data changes, it may be determined the device and the application have been tampered with.

In an example, the modular application manager 506 may receive information about the security policy of the software stack of the edge device 502. Also, the modular application manager 506 may receive information about the integrity of the software stack, the integrity of the modular application, the integrity of the memory utilized during execution of the application and the like.

At block 808, it may be determined whether there has been a breach in the integrity of the modular application. In an example, the modular application manager 506 may determine whether there has been a breach in the integrity of the modular application 302 or the integrity of the software stack. The modular application manager 506 may determine the integrity breach based on the received accreditation hashes, repetition attack detection when the same request is received using the same TPM key many times, based on TPM's marked as a rogue in the database of a certification authority and the like.

In case a security breach is detected, the method 800 may proceed to (Yes branch) block 810. At block 810 a remedial action to address the breach may be performed. In an example, the remedial action may involve blacklisting a TPM as a rouge TPM, scrutiny of the modular application 302 to determine whether the code has malicious code embedded in the modular application 302, suspending metering of the resource utilization of the modular application 302, and suspending the execution privileges of the modular application 302 using the TPM and remote policy enforcement, and determining the integrity of the software stack of the edge device and identify the source of the tampering.

However, if no security breach is detected, the method 800 may proceed to ('No' path) block 812, where resource utilization by the modular application may be metered, for instance, using a distributed ledger.

FIG. 9 shows a flowchart of a method 900 for metering a modular application according to an embodiment of the present disclosure. The method 900 is described by way of example as being performed by the systems described above or any other system with similar computing capabilities. The method 900 and other methods and operations described herein may be performed by one or more servers or other types of computers including at least one processor executing machine-readable instructions. Also, one or more of the steps of the method 900 and steps of other methods described herein may be performed in a different order than shown or may be performed simultaneously or substantially simultaneously.

At block 902, request to secure a modular application associated with an edge device may be received. In an example, the instructions may be received from a modular application manager 506. The security parameters may include, for example, instructions on securing a modular application. For example, the instructions may detail the security settings, permissions, interactions and the like for the modular application 302.

In one example, the modular application manager 506 may provide security policy such as security parameters to generate a secure enclave for the modular application on the edge device 502. As described above, the security policy may prevent the execution of the modular application 302 before the secure enclave has been generated. In examples, the secure enclave may include locking a few processes associated with an application and the memory associated with the application. In other examples, the secure enclave may include hardware with a secret inaccessible to the software stack on the edge device 502.

At block 904, a secure enclave may be generated for the modular application. Further, in cases, where multiple modular applications are integrated, multiple secure enclaves may be generated on multiple edge devices. In an example, the edge device 502 or applications such as the security manager 510 on the edge device 502 may generate a secure enclave. In an example, a secure enclave may be generated using a hardware encryption device, such as TPM. In other examples, processors may have dedicated low-level instructions to that can create a secure enclave. In examples, the edge device 502 may include hardware TPM with a secure enclave separate from the main CPU and memory.

At block 906, the modular application may be monitored for metering and/or tampering. In an example, the hardware encryption device of the edge device 502 may be used the security manager 510 to determine the system utilization in the secure enclave or the threads of the modular application 302. The hardware encryption device may generate a hash of the memory and CPU utilization logs and attest them and transfer them to the modular application manager 506. In examples, the edge device 502 may determine the utilization or running time for the modular application 302A, the output of the modular application 302A, the input of the modular application 302A and the like.

In an example, the resource utilization may be determined using a distributed ledger, such as a blockchain. As mentioned earlier, the distributed ledger may include a smart contract for trustworthy metering. Further, the resource utilization may be determined based on a predefined unit of consumption. The unit of consumption may be time based, activity based, etc. The resource consumption may be determined, based on at least one of proof of work consensus and a proof of elapsed time. The entries from the distributed ledger periodically to determine system resource utilization.

In an example, an edge device with lower system utilization may be determined to migrate one or more modular applications to optimize resource utilization. In another example, the edge device with lower bandwidth latency may be determined migrate the one or more modular applications to optimize resource utilization.

At block 908, based on the metering, a resource utilization receipt indicative of financial units corresponding to system resources utilized may be generated. In examples, billing may be based on the utilization parameters such as the CPU utilization, the memory utilization, the demand for system resources when the modular application 302 was executed, the peak and off-peak electricity prices or any such metering scheme based on system utilization, and application utilization.

FIG. 10 shows a flowchart of a method 1000 for generating a service or an application using a combination of modular applications according to an embodiment of the present disclosure. The method 1000 is described by way of example as being performed by various systems described above. The method 1000 and other methods and operations described herein may be performed by one or more servers or other types of computers including at least one processor executing machine readable instructions. Also, one or more of the steps of the method 1000 and steps of other methods described herein may be performed in a different order than shown or may be performed simultaneously or substantially simultaneously.

At block 1002, a request to generate one or more secure enclaves may be received. In an example, the edge device 502 or the security manager 510 may receive instructions such as a set of security parameters from the modular application manager 506 to generate the secure enclaves. In an example, the security parameters may include instructions on securing a modular application. For example, the instructions may detail the security settings, permissions, interactions and the like for the modular application 302.

In an example, the modular application manager 506 may provide security policy such as security parameters to generate a secure enclave for the modular application on the edge device 502. The security policy may prevent the execution of the modular application 302 before the secure enclave has been generated. In examples, the secure enclave may include locking a few processes associated with an application and the memory associated with the application.

In other examples, the secure enclave may include hardware with a secret value inaccessible to the software stack on the edge device 502. The edge device 502 or applications such as the security manager on the edge device 502 may generate the secure enclaves. In an example, a secure enclave may be generated by a hardware encryption device. In other examples, processors may have dedicated low-level instructions to that can create a secure enclave. In examples, the edge device 502 may include hardware based hardware encryption device with a secure enclave separate from the main CPU and memory.

At block 1004, the modular applications may be initialized in the secure enclaves. In an example, the modular application manager 506 may initialize the modular applications in the secure enclaves. The modular applications may be executed in secure enclaves with different configurations. For examples, the secure enclaves may allow further segregation of processes to secure processes and memory of the modular applications in one or more instances. Further segregation allows applications to execute without the risk of malware. Also, secure enclaves may communicate securely with the modular application manager 506 to retrieve additional information using secure channels using the hardware encryption device.

At block 1006, outputs of the modular applications may be interconnected to generate a system or service. In an example, a cloud based artificial intelligence platform may be integrated with modular applications on edge devices. This may allow dynamic functionality of modular applications.

At block 1008, utilization of the modular applications in the secure enclaves may be monitored to determine the metering for the service. In examples, the modular applications may be present in multiple locations and metering the modular applications on different devices may be performed using the methods set forth with reference to FIG. 5 and FIG. 6. In an example, the fabric controller may add all the received utilization metering for the modular applications to determine a cost for the service. Also, the metering may be accurate because of the secure enclaves housing the modular application.

In an example, one modular application may be on an edge device and another modular application may be on a cloud device. In such a case the resource utilization may be determined as a ratio of resource utilization on the cloud and the edge device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A system for securing modular applications and associated edge devices, the system comprising:
   a processor; and
   a modular application manager including a non-transitory computer readable medium storing machine readable instructions that when executed by the processor cause the processor to:
      initiate an accreditation request for accrediting at least one of a modular application or an edge device hosting the modular application, the edge device coupling an IoT device to a cloud server;
      based on the initiating, receive accreditation information corresponding to the at least one of the modular application or the edge device, the accreditation information being generated by a hardware encryption device associated with the edge device;
      monitor accreditation status of the modular application during execution of the modular application to ascertain whether the modular application and the edge device have been tampered by
         embedding instructions to generate a proof of work hash during the execution of the modular application in a secure enclave, wherein the proof of work hash includes a time of execution, a resource utilization, and a nonce associated with the modular application; and
      perform a remedial action to address tampering of the at least one of the modular application or the edge device, when the tampering is detected.

2. The system as claimed in claim 1, wherein the modular application manager is implemented in the edge device.

3. The system as claimed in claim 2, wherein the hardware encryption of the edge device is a trusted platform module (TPM) that is to cryptographically attest resource utilization on the edge device.

4. The system as claimed in claim 1, wherein the accreditation information includes
   a hash of memory content of the edge device signed with a cryptographic key.

5. The system as claimed in claim 1, wherein the remedial action comprises blacklisting the hardware encryption device.

6. The system as claimed in claim 1, wherein the system further comprises a security manager coupled to the processor to meter resource utilization by the modular application, when no tampering is detected.

7. The system as claimed in claim 6, wherein the resource utilization is metered using a distributed ledger.

8. The system as claimed in claim 1, wherein the modular application manager is to include a set of policies to implement varying levels of secure enclaves using a root of trust and the hardware encryption device, the set of policies to include at least one of policies on securing the modular application, securing the edge device, or metering resource utilization by the modular application.

9. The system as claimed in claim 8, wherein a security manager of the system is to generate the secure enclave for executing the modular application based on the set of policies, and wherein the secure enclave creates a protection region to ensure all operations pertaining to the modular application are performed in the protected region.

10. A method comprising:
  initiating an accreditation request for accrediting at least one of a modular application or an edge device hosting the modular application, the edge device coupling an IoT device to a cloud server;
  based on initiating, receiving accreditation information corresponding to at least one of the modular application or the edge device, the accreditation information being generated by a hardware encryption device associated with the edge device;
    monitoring an accreditation status of the modular application during execution of the modular application to ascertain whether the modular application or the edge device have been tampered by
    embedding instructions to generate a proof of work hash during the execution of the modular application in a secure enclave, wherein the proof of work hash includes a time of execution, a resource utilization, and a nonce associated with the modular application; and
  performing a remedial action to address tampering of at least one of the modular application or the edge device, when the tampering is detected.

11. The method as claimed in claim 10, wherein the accreditation information includes:
  a hash of a modular application log signed with a cryptographic key.

12. The method as claimed in claim 10, wherein performing the remedial action comprises suspending metering of resource utilization by the modular application.

13. The method as claimed in claim 10, wherein the method further comprises generating the secure enclave for executing the modular application, based on a set of policies, and wherein the secure enclave creates a protection region to ensure all operations pertaining to the modular application are performed in the protected region.

14. A non-transitory computer readable medium including machine readable instructions that are executable by a processor to:
  initiate an accreditation request for accrediting at least one of a modular application or an edge device hosting the modular application, the edge device coupling an IoT device to a cloud server;
  based on initiating, receive accreditation information corresponding to at least one of the modular application or the edge device, the accreditation information being generated by a hardware encryption device associated with the edge device;
    monitor an accreditation status of the modular application during execution of the modular application to ascertain whether the modular application and the edge device have been tampered by
    embedding instructions to generate a proof of work hash during the execution of the modular application in a secure enclave, wherein the proof of work hash includes a time of execution, a resource utilization, and a nonce associated with the modular application; and
  perform a remedial action to address tampering of at least one of the modular application or the edge device, when the tampering is detected.

15. The non-transitory computer readable medium as claimed in claim 14, wherein the accreditation information includes
  a hash of a software stack on the edge device associated with the modular application.

16. The non-transitory computer readable medium as claimed in claim 14, wherein to perform the remedial action, the processor is to
  determine an integrity of a software stack of the edge device and identify a source of the tampering.

17. The non-transitory computer readable medium as claimed in claim 14, wherein the processor is to meter resource utilization by the modular application using a distributed ledger, when no tampering is detected.

18. The non-transitory computer readable medium as claimed in claim 14, wherein the processor is to generate the secure enclave for executing the modular application, based on a set of policies, and wherein the secure enclave creates a protection region to ensure all operations pertaining to the modular application are performed in the protected region.

* * * * *